(No Model.) 2 Sheets—Sheet 1.

W. P. FREEMAN.
GOVERNOR FOR DYNAMO ELECTRIC MACHINES.

No. 290,025. Patented Dec. 11, 1883.

WITNESSES:
James J. Tobins
Harry L. Ashenfelter

INVENTOR:
Warren P. Freeman
by his Attys
Howson and Sons (No Model.) 2 Sheets—Sheet 2.
W. P. FREEMAN.
GOVERNOR FOR DYNAMO ELECTRIC MACHINES.

No. 290,025. Patented Dec. 11, 1883.

WITNESSES:
James J. Tobin
David Williams

INVENTOR:
Warren P. Freeman
by his Attorneys
Howson and Sons

UNITED STATES PATENT OFFICE.

WARREN P. FREEMAN, OF BROOKLYN, NEW YORK, ASSIGNOR TO WILLIAM F. JOBBINS, OF SAME PLACE.

GOVERNOR FOR DYNAMO-ELECTRIC MACHINES.

SPECIFICATION forming part of Letters Patent No. 290,025, dated December 11, 1883.

Application filed March 15, 1883. (No model.)

*To all whom it may concern:*

Be it known that I, WARREN P. FREEMAN, a citizen of the United States, and a resident of Brooklyn, Kings county, New York, have invented certain Improvements in Governors for Dynamo-Electric Machines, of which the following is a specification.

The object of my invention is to construct a simple governing device for automatically regulating the current from a dynamo-electric machine, and this object I attain by combining the field-magnet coils with a commutator and a movable contact controlled by an armature acted on by one of the poles of the field-magnet, as more fully described hereinafter.

Figure 1:
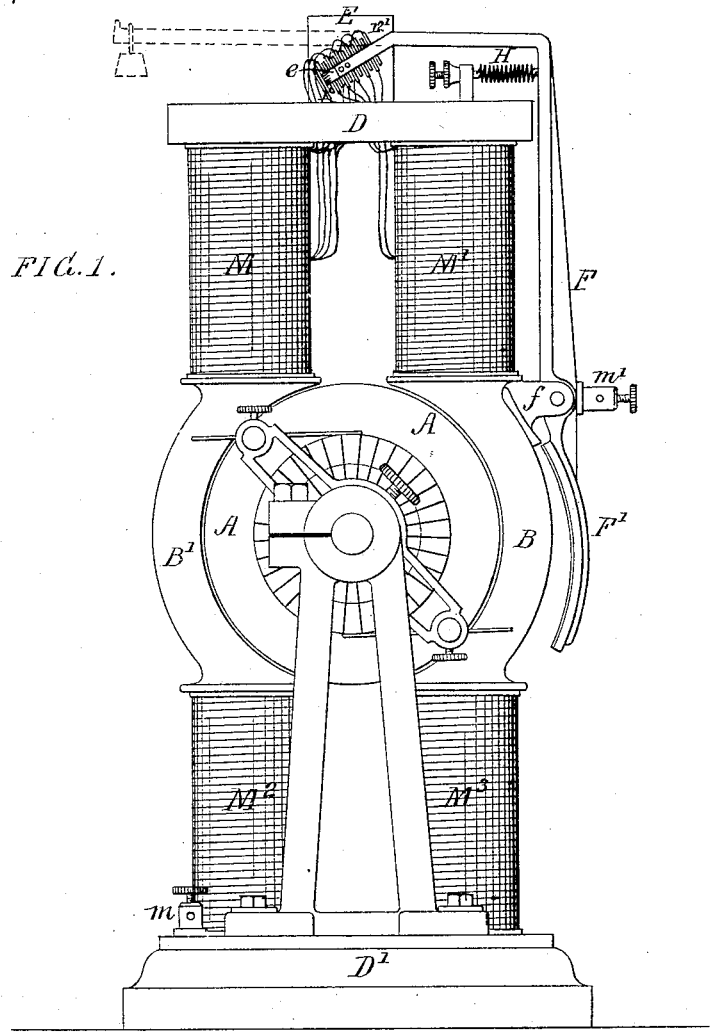
Figure 2:
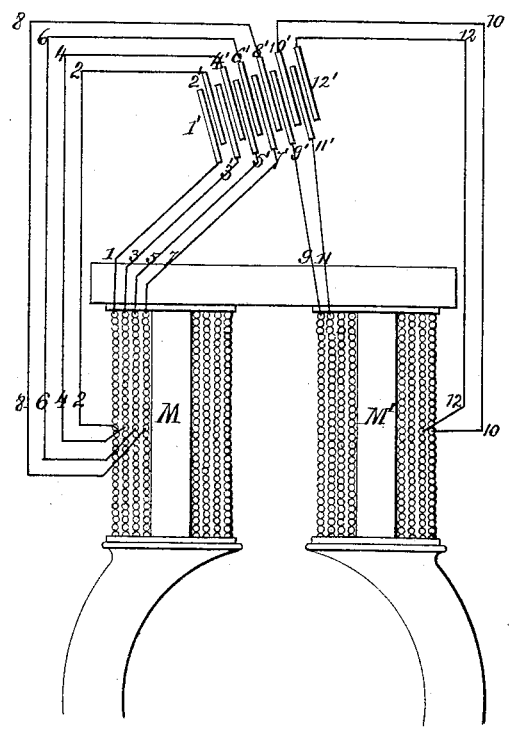

In the accompanying drawings, Figure 1 is an end view of a dynamo-electric machine having my improvement applied thereto, and Fig. 2 a diagram illustrating the circuits.

The dynamo-electric machine may be of almost any of the various well-known constructions; but I prefer that shown in the drawings, in which A indicates the armature; M, M', M², and M³, the field-magnet coils; B B', the curved poles; D, the top connecting-plate, and D' the base.

One or both of the coils M M' have connected to them at a number of different points conductors 1 2 3 4, &c., which are also electrically connected with the insulated plates 1' 2' 3' 4', &c., of the commutator E, preferably mounted on the top plate, D, so that by putting the working-circuit in electric connection with one or other of these commutator-plates fewer or more of the coils of the field-magnets will be cut out of circuit, and the current proportionately increased or diminished.

To lugs *f* on one of the pole-pieces B is pivoted an armature-lever, F, carrying a curved armature, F', adapted to be directly acted on by the pole-piece B. The other end of the armature-lever extends above the top plate, D, and carries a contact brush or piece, *e*, which can be moved over and in electrical contact with the commutator-plates E. A spring, H, acts on the lever F, to counterbalance the magnetic attraction of the pole-piece for the armature, and can be adjusted by suitable means to the desired tension.

One of the binding-posts, *m*, for the external circuit is connected to the terminal of the non-sectional coils, while the other, *m'*, is in electrical contact with the lever F and its contact-point *e*. The conductor 1 runs from the first section or coil of the field, and the branch 2 from the second section, and so on, so that when the brush *e* is in contact with the plate 1' all the coils of the field will be in circuit; but when the brush is moved over into contact with 2' the first section or coil of the field will be cut out, and a proportionate reduction in the current in the working-circuit results. This reduction will increase as the brush is moved over the commutator away from plate 1'. The spring H is so adjusted that when the machine is producing the normal or desired current it will balance the magnetic attraction on the armature F'; but when there is an undue increase in the current the magnetism of the pole B will increase, so as to attract the armature F' against the pull of the spring and move the brush *e* over the commutator away from the plate 1', to cut out one or more sections of the coils, and thereby reduce the current to the normal point. In like manner, on an undue decrease in the current, the spring H will overbalance the magnetic attraction on the armature and move the lever F over to include more of the coils in the circuit.

It is not essential that the contact-brush *e* should be carried by the armature-lever F, as it may be carried by a lever operated by the latter with good effect, and a balance-weight may be substituted for the spring, as indicated by dotted lines, and the point of location of the armature-lever and commutator may be changed, so long as the armature F' is arranged to be acted on by one of the poles of the field-magnets themselves, for, owing to this construction, I am enabled to dispense with the use of an electro-magnet in the external circuit, which would have to be of considerable size and power for practical purposes.

I claim as my invention—

The combination of the field-magnets of a dynamo-electric machine with a commutator having its plates electrically connected with different sections of the field-coils, an armature-lever carrying an armature acted on by a pole of the field-magnets, adjustable spring or balance, and a contact, *e*, adapted to be moved over the said commutator by the armature-lever, all substantially as set forth.

In testimony whereof I have signed my name to this specification in the presence of two subscribing witnesses.

WARREN P. FREEMAN.

Witnesses:
HUBERT HOWSON,
JAMES C. EADIE.